United States Patent [19]

Everhart

[11] Patent Number: 4,958,717
[45] Date of Patent: Sep. 25, 1990

[54] SKID CONVEYOR SYSTEM

[75] Inventor: John D. Everhart, Veneta, Oreg.

[73] Assignee: Spectra-Physics, Inc., San Jose, Calif.

[21] Appl. No.: 317,738

[22] Filed: Mar. 1, 1989

[51] Int. Cl.$^5$ .......................................... B65G 47/24
[52] U.S. Cl. ..................................... 198/416; 198/787
[58] Field of Search ............... 198/416, 599, 636, 637, 198/787, 465.3; 193/35 R, 35 C

[56] References Cited

U.S. PATENT DOCUMENTS

| 2,729,324 | 1/1956 | Howdle | 198/416 |
| 3,507,379 | 4/1970 | Johnston | 198/787 |
| 3,650,373 | 3/1972 | Kern et al. | 198/465.3 X |
| 4,479,572 | 10/1984 | Merz | 198/465.3 X |
| 4,683,707 | 8/1987 | Koyama | 198/787 X |

FOREIGN PATENT DOCUMENTS 477144  12/1937  United Kingdom ................ 198/787

Primary Examiner—Joseph E. Valenza
Assistant Examiner—Cheryl L. Gastineau
Attorney, Agent, or Firm—Killworth, Gottman, Hagan & Schaeff

[57] ABSTRACT

A conveyor system for carrying skids supporting products to be assembled along an assembly line comprises straight sections of driven belt conveyors having skid positioning rails extending above the surface of the belt conveyors on either side with the rails being spaced to receive the skids therebetween to position the skids across the belt conveyors. Arcuate sections of driven roller conveyors are positioned between the straight sections of belt conveyors with the roller conveyors being wider than the belt conveyors to accommodate rotation of the skids as they are carried around the roller conveyors. Skid orienting apparatus is positioned adjacent the outlet ends of the roller conveyors for squaring the skids relative to the belt conveyors such that skids carried along the conveyor system are smoothly conveyed from the arcuate roller conveyors to the straight belt conveyors in spite of angular misorientation of the skids along the roller conveyors, which misorientation could otherwise cause jamming of the skids upon attempted entry into the narrower. Straight belt conveyors.

7 Claims, 2 Drawing Sheets

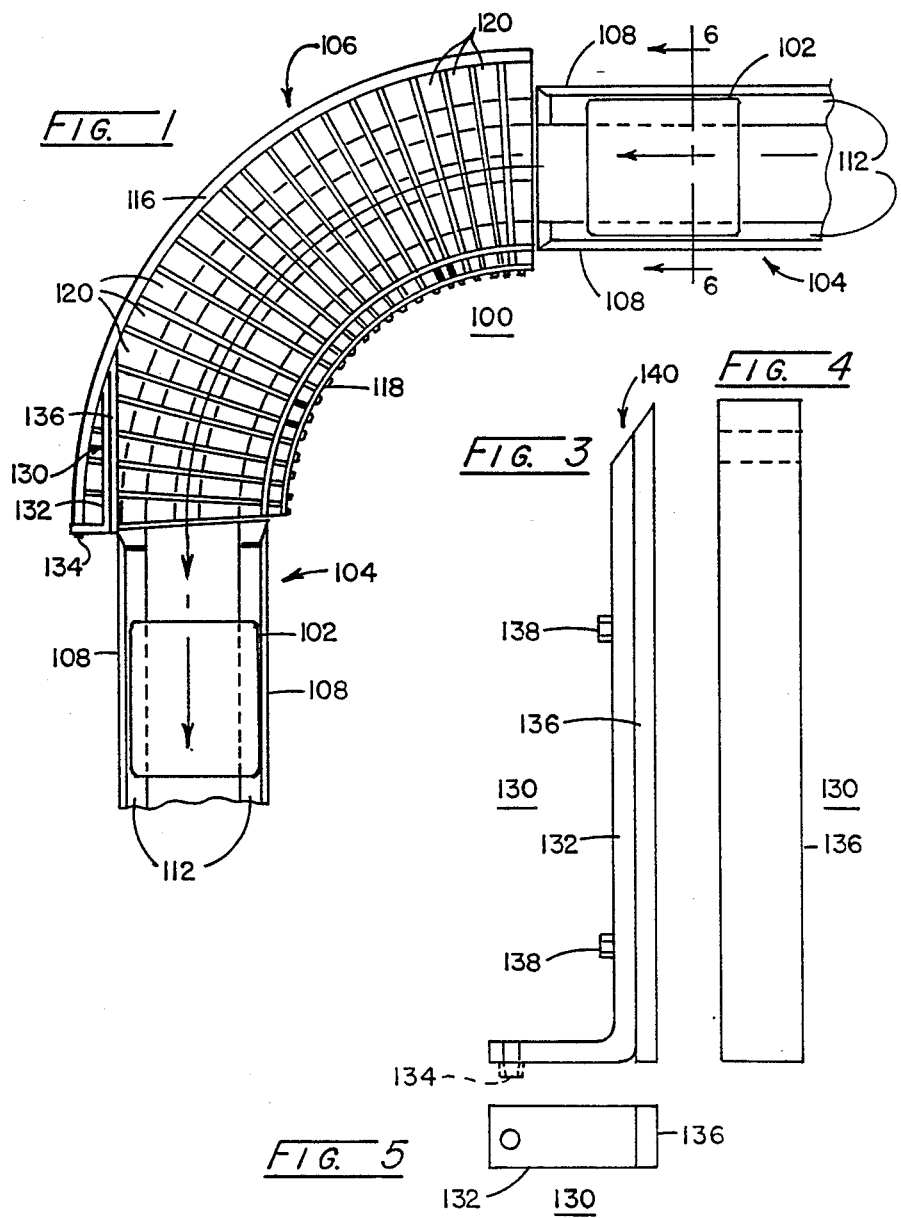

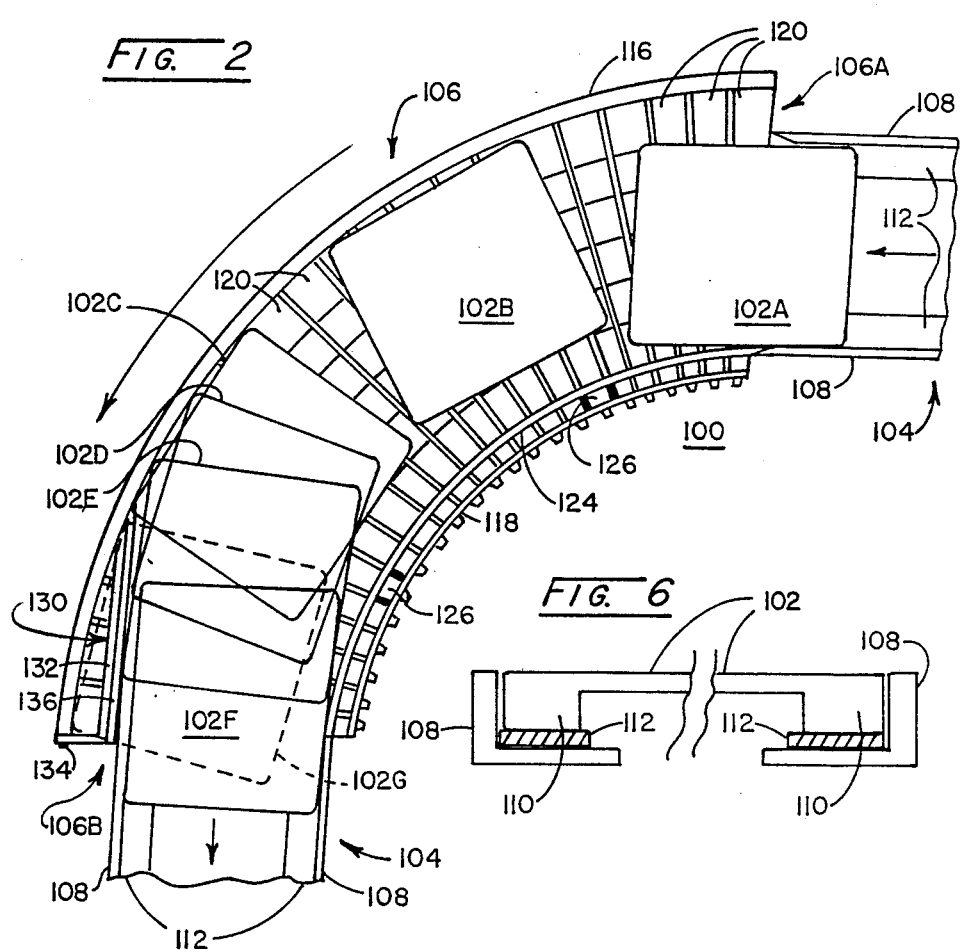

SKID CONVEYOR SYSTEM

BACKGROUND OF THE INVENTION

The present invention relates generally to conveyor systems for carrying products to be assembled along an assembly line including a number of assembly stations and, more particularly, to such a conveyor system wherein sections of arcuate conveyors interconnecting sections of conveyors orient the products carried by the conveyor system such that the products are smoothly conveyed from the arcuate conveyors to the straight conveyors in spite of angular misorientation of the products along the arcuate conveyors.

In modern assembly line conveyor systems. products or product carriers must be positioned with sufficient accuracy at work stations of the line such that automated as well as manual assembly steps can be performed on the products. To effect this positioning. the products are restrained laterally across a conveyor and selectively stopped at defined work station locations along the conveyor.

While such systems work well for straight runs of conveyors, typically an assembly line progresses around corners of 90° or more. When two straight conveyor sections are interconnected by an arcuate corner conveyor section, the arcuate conveyor section must accommodate rotating movement of the products as they are conveyed around the corner. The resulting misorientation of the products as they are conveyed around the corner creates a problem in that the products may not smoothly enter the next straight conveyor section. Resulting jamming problems and disruptions of the assembly line cannot be tolerated.

Accordingly, there is a need for a conveyor system for carrying products or product carriers along an assembly line wherein straight conveyor sections which are angularly oriented relative to one another can be interconnected by means of arcuate conveyor sections such that products are smoothly conveyed from the arcuate conveyors to the straight conveyors in spite of angular misorientations of the products along the arcuate conveyors.

SUMMARY OF THE INVENTION

This need is met by a conveyor system in accordance with the present invention wherein product supporting carriers or skids are conveyed along straight sections of driven belt conveyors which are interconnected by arcuate sections of driven roller conveyors which include skid orienting means positioned adjacent outlet ends of the roller conveyors. The skid orienting means square up the skids relative to the belt conveyors such that the skids are smoothly passed from the arcuate roller conveyors to the straight belt conveyors in spite of angular misorientation of the skids along the arcuate roller conveyors.

In accordance with one aspect of the present invention, a conveyor system for carrying skids supporting products to be assembled along an assembly line including a number of assembly stations comprises straight sections of driven belt conveyors having skid positioning rails extending above the surface of the belt conveyors on either side thereof with the rails being spaced to receive the skids therebetween to position the skids across the belt conveyors. Thus, the straight sections of driven belt conveyors serve to accurately position the skids and accordingly by the products supported for both automatic and manual assembly steps to be performed on the products. Arcuate sections of driven roller conveyors having inlet ends and outlet ends are positioned between sections of the belt conveyors which are angularly oriented relative to one another. The roller conveyors are wider than the belt conveyors to accommodate rotation of the skids as they are carried around the roller conveyors and also comprise skid orienting means positioned adjacent the outlet ends of the roller conveyors for squaring the skids relative to the belt conveyors. In this way, skids carried along the conveyor system are smoothly conveyed from the arcuate roller conveyors to the straight belt conveyors in spite of angular misorientation of the skids along the arcuate roller conveyors, which misorientation could otherwise cause jamming of the skids upon attempted entry into the straight belt conveyors.

Preferably, the product supporting skids each include a pair of support runners with one support runner being positioned along each outer longitudinal edge of the skid, and the belt conveyors comprise pairs of parallel narrow belts, with one of the belts being positioned adjacent each of the rails such that the skids are carried along the belt conveyors by engagement of the belts with the runners. In this way, the skids can be retained at a station of the assembly line with the associated pair of belts sliding beneath the runners while the skid is retained at the station.

The skid orienting means preferably comprises a partial chord member extending from the outer wall of the arcuate roller conveyor to a point adjacent and substantially aligned with the outer rail of an inlet end of a straight belt conveyor section to which skids are to be passed. The partial chord member preferably comprises a smooth face member to facilitate orienting movement of skids along the partial chord member. To facilitate sliding engagement of the belts with the skid runners, and also sliding engagement of the skids with the partial chord member, the support runners and smooth face member of the partial chord member are preferably made of graphite filled polyamide.

It is thus a primary object of the present invention to provide an improved conveyor system for carrying skids supporting products to be assembled along an assembly line wherein straight sections of driven belt conveyors are interconnected by means of arcuate sections of driven roller conveyors which include skid orienting means positioned adjacent their outlet ends to square up the skids relative to the belt conveyors such that skids carried along the conveyor system are smoothly conveyed from the arcuate roller conveyors to the straight belt conveyors.

Other objects and advantages of the invention will be apparent from the following description, the accompanying drawings and the appended claims.

BRIEF DESCRIPTION OF THE DRAWINGS

FIG. 1 is a plan view of a corner of an assembly line conveyor system in accordance with the present invention;

FIG. 2 shows the arcuate roller conveyor of FIG. 1 on an enlarged scale and the positioning of skids as they are carried around the arcuate conveyor;

FIGS. 3–5 are front, side and bottom Views of the skid orienting means of the present invention; and FIG. 6 is a sectional view taken along the section line 6—6 of FIG. 1.

DETAILED DESCRIPTION OF THE INVENTION

A corner section of an assembly line conveyor system 100 in accordance with the present invention is shown in plan view in FIG. 1. Product supporting carriers or skids 102 are carried along straight sections of driven belt conveyors 104 which are interconnected by arcuate sections of driven roller conveyors 106 with a representative 90 degree corner conveyor being shown in FIG. 1. The assembly line includes a number of workstations which could be, for example, the positions of the skids 102 along the straight belt conveyors 104 as shown in FIG. 1. The skids 102 are positioned with sufficient accuracy at workstations of the assembly line conveyor system 100 such that automated as well as manual assembly steps can be performed on the products supported by the skids 102. Skid positioning rails 108 extend above the surface of the belt conveyors 104 on either side thereof with the rails 108 being spaced to receive the skids 102 therebetween to position the skids 102 across the belt conveyors 104.

The product supporting skids 102 each include a pair of support runners 110 with one of the support runners 110 being positioned along each outer longitudinal edge of the skid 102 see FIG. 6. For this construction of the skids 102, the belt conVeyors 104 comprise pairs of parallel narrow belts 112 with one of the belts 112 being positioned adjacent each of the rails 108 such that the skids 102 are carried along the belt conveyors 104 by engagement of the belts 112 with the runners 110. In this way, the skids 102 can be readily retained at a workstation of the assembly line conveyor system 100 by retaining the skid 102 at a station while the belts 112 slide beneath the runners 110. Once the assembly step is performed at a given workstation, the skid 102 is released and once again carried along the straight section of belt conVeyor 104 by means of the belts 112 engaging the runners 110.

The arcuate driven roller conveyors 106 have inlet ends 106A and outlet ends 106B with the arcuate sections of driven roller conveyors 106 being positioned between straight sections of the belt conveyors 104 which are angularly oriented relative to one another, for example, at an angle of 90° as shown in FIG. 1. The roller conveyors 106 are wider than the belt conveyors 104 to accommodate rotation of the skids 102 as they are carried around the roller conveyors 106.

The roller conveyors 106 comprise a skid retaining rail formed as an outer arcuate wall 116 and an inner arcuate wall 118 with conically shaped rollers 120 supported for driven rotation therebetween. In the illustrated embodiment, the conical rollers 120 are segmented; however, any type of arcuate driven roller conveyor can be used in the present invention. The outer arcuate rail 116 extends above the upper surface of the roller conveyor 106. The inner side of each roller conveyor 106 is protected from inadvertent ejection of a skid 102 by means of an inner guard rail 124 which is supported by means of brackets 126 extending between the guard rail 124 and the inner arcuate wall 118. The guard rail 124 is normally not substantially contacted by the skids 102 as best shown in FIG. 2; however, it is provided to prevent ejection of one or more skids 102 in the event of jamming or malfunction.

In accordance with the present invention, the roller conveyors 106 further comprise skid orienting means positioned adjacent then outlet ends 106B. In accordance with the skid orienting means, skids 102 carried along the conveyor system 100 are smoothly conveyed from arcuate roller conveyors 106 to the straight belt conveyors 104 in spite of angular misorientation of the skids along the arcuate roller conveyors 106 which misorientation could otherwise cause jamming of the skids upon attempted entry into the straight belt conveyors 104.

Movement of the skids 102 around the arcuate roller conveyor 106 is shown in FIG. 6 as a skid 102 progresses from the position where it is still retained by the in-feed belt conveyor 104 as shoWn by the skid 102A to the point where the skid 102 is once again positioned by an out feed belt conveyor as shown by the skid 102F. The skid straightening or orienting operation is most apparent from the series of skids 102C through 102F with the otherwise resulting misorientation being shown by the dotted line skid 102G.

In the preferred embodiment of the invention, the skid orienting means comprises a partial chord member 130 as best shown in FIGS. 3-5. The partial chord member 130 includes a generally L-shaped support bracket 132 which is secured to the outer arcuate rail 116 of the arcuate roller conveyor 106 by means of a bolt 134 or otherwise. The partial chord member 130 preferably comprises a smooth face member 136 which is secured to the elongated leg of the generally L-shaped member 132 by means of bolts 138 or otherwise.

The distal end 140 of the partial cord member 130 is shaped to conform to the inner surface of the outer arcuate rail 116 of the arcuate roller conveyor 106. To facilitate sliding engagement of the skids 102 with the partial chord member 130, the smooth face member 136 is preferably formed of graphite filled polyamide. The support runners 110 of the skids 102 are also preferably made of graphite filled polyamide to facilitate sliding engagement of the belts 112 with the runners 110 when the skids 102 are retained at a workstation along the assembly line.

Having described the invention in detail and by way of reference to preferred embodiments thereof, it will be apparent that other modifications and variations are possible without departing from the scope of the invention defined in the appended claims.

What is claimed is:

1. A conveyor system for carrying skids supporting products to be assembled along an assembly line including a number of assembly stations, said conveyor system comprising:

straight sections of driven belt conveyors having inlet ends and outlet ends and skid positioning inner and outer rails extending above the surface of the belt conveyors on either side thereof, said rails being spaced to receive said skids therebetween to position said skids across said belt conveyors; and arcuate sections of driven roller conveyors having inlet ends and outlet ends and a skid retaining rail extending above the surface of said roller conveyors on the outer side thereof for preventing skids from falling from said roller conveyors, said roller conveyors being positioned between sections of said belt conveyors to couple sections of said belt conveyors which are angularly oriented relative to one another, being wider than said belt conveyors to accommodate rotation of said skids as they are carried around said roller conveyors and comprising skid orienting means positioned adjacent said outlet ends of said roller conveyors, said skid orienting means comprising a partial chord member extending from the skid retaining rail of said arcuate roller conveyor to a point adjacent and substantially aligned with the outer rail of the inlet end of a straight belt conveyor section to which skids are to be passed for squaring said kids relative to said belt conveyors whereby skids carried along said conveyor system are smoothly conveyed from said arcuate roller conveyors to said straight belt conveyors in spite of angular misorientation of said skids along said arcuate roller conveyors which misorientation would otherwise cause jamming of said skids upon attempted entry into said straight belt conveyors.

2. A conveyor system for carrying skids supporting products to be assembled along an assembly line as claimed in claim 1 wherein said skids each include a pair of support runners, one support runner positioned along each outer longitudinal edge, and said driven belt conveyors comprise pairs of parallel, narrow belts, one of said belts being positioned adjacent each of said rails whereby said skids are carried along said belt conveyors by engagement of said belts with said runners but can be retained at a station with the associated pair of belts sliding beneath said runners while so retained.

3. A conveyor system for carrying skids supporting products to be assembled along an assembly line as claimed in claim 2 wherein said partial chord member comprises a smooth face member to facilitate orienting movement of skids along said partial chord member.

4. A conveyor system for carrying skids supporting products to be assembled along an assembly line as claimed in claim 3 wherein said support runners are made of graphite filled polyamide.

5. A conveyor system for carrying skids supporting products to be assembled along an assembly line as claimed in claim 4 wherein said smooth face member is made of graphite filled polyamide.

6. A conveyor system for carrying skids supporting products to be assembled along an assembly line including a number of assembly stations, said conveyor system comprising:

straight sections of driven belt conveyors having inlet ends and outlet ends and skid positioning inner and outer rails extending above the surface of the belt conveyors on either side thereof, said rails being spaced to receive said skids therebetween to position said skids across said belt conveyors; and arcuate sections of driven roller conveyors having inlet ends and outlet ends positioned between sections of said belt conveyors to couple sections of said belt conveyors which are angularly oriented relative to one another, said roller conveyors being wider than said belt conveyors to accommodate rotation of said skids as they are carried around said roller conveyors and including an outer wall for retaining skids and skid orienting means positioned adjacent said outlet ends of said roller conveyors, said skid orienting means comprising a partial chord member extending from the outer wall of said arcuate roller conveyor to a point adjacent and substantially aligned with the outer rail of the inlet end of a straight belt conveyor section to which skids are to be passed for squaring said skids relative to said belt conveyors whereby skids carried along said conveyor system are smoothly conveyed from said arcuate roller conveyors to said straight belt conveyors in spite of angular misorientation of said skids along said arcuate roller conveyors which misorientation would otherwise cause jamming of said skids upon attempted entry into said straight belt conveyors.

7. A conveyor system for carrying skids supporting products to be assembled alogn an assembly line as claimed in claim 6 wherein said partial chord member comprises a smooth face member to facilitate orienting movement of skids along said partial chord member.

* * * * *